United States Patent
Kunz et al.

(10) Patent No.: US 10,553,008 B2
(45) Date of Patent: *Feb. 4, 2020

(54) SPATIAL AND HIERARCHICAL PLACEMENT OF IMAGES AT RUNTIME

(71) Applicant: International Business Machines Corporation, Armonk, NY (US)

(72) Inventors: James R. Kunz, Maine, NY (US); Virginia L. Li, Wappingers Falls, NY (US); William F. Phillips, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,886

(22) Filed: Apr. 22, 2019

(65) Prior Publication Data

US 2019/0251727 A1 Aug. 15, 2019

Related U.S. Application Data

(63) Continuation of application No. 15/272,723, filed on Sep. 22, 2016, now Pat. No. 10,319,127.

(51) Int. Cl.
*G06T 11/60* (2006.01)
*G06F 3/0484* (2013.01)
*G06F 11/00* (2006.01)

(52) U.S. Cl.
CPC .......... *G06T 11/60* (2013.01); *G06F 3/04845* (2013.01); *G06F 11/00* (2013.01); *G06T 2200/24* (2013.01)

(58) Field of Classification Search
CPC . G06T 11/60; G06T 2200/24; G06F 3/04845; G06F 11/00
See application file for complete search history.

(56) References Cited

U.S. PATENT DOCUMENTS 8,462,176 B1 6/2013 Stubbs et al.
9,361,716 B1 6/2016 Erikson
(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.
(Continued)

*Primary Examiner* — Chong Wu
(74) *Attorney, Agent, or Firm* — Heslin Rothenberg Farley & Mesiti P.C.; Edward Wixted, Esq.

(57) ABSTRACT

A method, computer program product, and system for automatic placement and layering of images at runtime include a processor(s) obtaining images that represent components of an object, including a first image and a second image. The processor(s) annotates the first image with data indicating one or more locations on the first image where the second image can be placed. The processor(s) determines, during runtime, a position or orientation of the one or more locations on the first image, based on the annotated first image. The processor(s) compares each location to data in a system file to determine a first location that is a placement for the second image on the first image. The processor(s) layers the second image over the first image at the first location. The processor(s) renders the two dimensional model of the object, including the layered images, displays it in the graphical user interface.

20 Claims, 9 Drawing Sheets

500

510 One or more programs obtain a first image and a second image, where the first image and the second image comprise representations of two components that comprise an object.

520 One or more programs annotate the first image with data indicating one or more locations on the first image where the second image can be placed.

530 At runtime, the one or more programs obtain the annotated first image and determine the position and orientation of the one or more locations of the first image based on the annotation(s).

540 One or more programs compares each location of the one or more locations to data in a system file to determine, for each location, whether the second image should be placed at that location, in order to place the second image in a location that is a correct placement for the second image on the first image.

550 One or more programs superimpose the second image over the first image at the correct placement, positioning the second image on a location of the one or more locations.

560 One or more programs render and display in a graphical user interface, the two dimensional model of the object comprising the second image superimposed on the first image.

(56) References Cited

U.S. PATENT DOCUMENTS

| | | |
|---|---|---|
| 2009/0273612 A1 | 11/2009 | Xie |
| 2010/0245563 A1 | 9/2010 | Golovchinsky et al. |
| 2010/0275152 A1 | 10/2010 | Atkins et al. |
| 2011/0317351 A1 | 12/2011 | Pizzolato et al. |
| 2013/0201201 A1 | 8/2013 | Morinaga et al. |
| 2013/0330055 A1 | 12/2013 | Zimmermann et al. |
| 2014/0289605 A1 | 9/2014 | Buelow et al. |
| 2015/0042837 A1 | 2/2015 | Chen et al. |
| 2018/0082453 A1 | 3/2018 | Kunz et al. |

OTHER PUBLICATIONS

List of IBM Patents or Patent Applications Treated as Related, May 3, 2019, 2 pages.

PRIOR ART

* File Format
* VPDLoc:IMGFilename:IMGBounds:IMGTranslate:IMGRotation:LayerIndex:Container
* VPDLOC - Location from VPD file
* IMGFilename - Filename of example SVG file, this is only used in ViewEditor.
* IMGBounds - Bounds of image in 2D space (x, y, w, h)
* IMGTranslation - Translation of image in 2D space (x, y)
* IMGRotation - Rotation of image in 2D space (degrees)
* LayerIndex - Layer index in 2D space, 1 is the top layer
* Container - Part which contains this part
Z_FRAME:Frame.svg:0.0,0.0,133.4288,359.4463:0.0,0.0:0.0:1:Machine Parts
Z41BIBF5:Ibf.svg:11.6,5.12,109.47,16.3361:11.6,5.12:0.0:2:Z_FRAME
Z39BIBF3 :Ibf.svg:11.6,21.4,109.47,16.3361:11.6,21.4:0.0:2:Z_FRAME
Z29BBPEA:BpeFront.svg:-0.05,37.86,125.0287,80.4585:-0.05,37.86:0.0:2:Z_FRAME
Z29BPS11:Bph.svg:120.87,37.76,7.7049,56.1683:120.87,37.76:0.0:3:Z29BBPEA
Z29BPS01:Bpr.svg:12.29,39.45,93.0348,10.4112:12.29,39.45:0.0:3:Z29BBPEA
Z29BPS02:Bpr.svg:12.29,50.02,93.0348,10.4112:12.29,50.02:0.0:3:Z29BBPEA
Z29BPS03:Bpr.svg:12.3,61.0,93.0348,10.4112:12.3,61.0:0.0:3:Z29BBPEA
Z29BPS04:Bpr.svg:12.3,71.59,93.0348,10.4112:12.3,71.59:0.0:3:Z29BBPEA
Z29BPS05:Bpr.svg:12.3,81.87,93.0348,10.4112:12.3,81.87:0.0:3:Z29BBPEA
Z29BPS06:Bpr.svg:12.37,92.81,93.0348,10.4112:12.37,92.81:0.0:3:Z29BBPEA
Z29BPS07:Bpc.svg:12.22,103.02,93.0155,5.0646:12.22,103.02:0.0:3:Z29BBPEA
Z29BPS08:Bpd.svg:12.28,108.41,93.0129,5.0658:12.28,108.41:0.0:3:Z29BBPE

| 510 | One or more programs obtain a first image and a second image, where the first image and the second image comprise representations of two components that comprise an object. |

| 520 | One or more programs annotate the first image with data indicating one or more locations on the first image where the second image can be placed. |

| 530 | At runtime, the one or more programs obtain the annotated first image and determine the position and orientation of the one or more locations of the first image based on the annotation(s). |

| 540 | One or more programs compares each location of the one or more locations to data in a system file to determine, for each location, whether the second image should be placed at that location, in order to place the second image in a location that is a correct placement for the second image on the first image. |

| 550 | One or more programs superimpose the second image over the first image at the correct placement, positioning the second image on a location of the one or more locations. |

| 560 | One or more programs render and display in a graphical user interface, the two dimensional model of the object comprising the second image superimposed on the first image. |

FIG. 5

SPATIAL AND HIERARCHICAL PLACEMENT OF IMAGES AT RUNTIME

BACKGROUND

In computer machine maintenance, a Repair and Verify (R&V) process involves generating a two dimensional (2D) representation of a mainframe computer at runtime by placing Scalable Vector Graphics (SVG) images of the individual parts in their proper locations. This computer-implemented process can be cumbersome in several ways. First, to create an accurate representation, the parts that comprise the physical machine must first be placed in the correct location, which is recorded in a separate file using a proprietary visual editor. One or more programs executing on a processing resource of a computer will utilize the file of locations at runtime to place the parts. Second, the layering of the parts (e.g., drawers placed in frames and I/O cards placed in drawers) must also be recorded to prevent parts in the back of the machine from being drawn over the parts in the front and any rotation of the parts must also be recorded. Finally, any changes to the part locations require loading the entire machine in the editor and moving the part or adding new locations for new parts. Thus, the process of creating a 2D representation of a mainframe computer, is both labor intensive and highly customized.

The end result of the R&V process is a detailed and voluminous file, which contains some type of identifier for each possible part location and the related 2D coordinates, layering, and rotation information. But for a machine with a large number of parts, this file can be become quite large and unwieldy. Additionally, the information in the file is not human readable and requires loading it into the proprietary editor to make any additions or adjustments.

SUMMARY

Shortcomings of the prior art are overcome and additional advantages are provided through the provision of a computer program product for automatic placement and layering of images at runtime. The computer program product comprises a storage medium readable by a processing circuit and storing instructions for execution by the processing circuit for performing a method. The method includes, for instance: obtaining, by one or more processors, images comprising representations of components that comprise an object, wherein the images comprise a first image and a second image; annotating, by the one or more processors, the first image, with data indicating one or more locations on the first image where the second image can be placed, wherein a display in a graphical user interface including the first image and the second image comprises a two dimensional model of the object; determining, by the one or more processors, during runtime, a position or orientation of the one or more locations on the first image, based on the annotated first image; comparing, by the one or more processors, each location of the one or more locations on the first image to data in a system file to determine a first location of the one or more locations that comprises a placement for the second image on the first image; based on the determining, superimposing, by the one or more processors, the second image over the first image at the first location; rendering, by the one or more processors, the two dimensional model of the object comprising the second image superimposed on the first image; and displaying, by the one or more processors, the two dimensional model in the graphical user interface.

Shortcomings of the prior art are overcome and additional advantages are provided through the provision of a method for automatic placement and layering of images at runtime. The method includes, for instance: obtaining, by one or more processors, images comprising representations of components that comprise an object, wherein the images comprise a first image and a second image; annotating, by the one or more processors, the first image, with data indicating one or more locations on the first image where the second image can be placed, wherein a display in a graphical user interface including the first image and the second image comprises a two dimensional model of the object; determining, by the one or more processors, during runtime, a position or orientation of the one or more locations on the first image, based on the annotated first image; comparing, by the one or more processors, each location of the one or more locations on the first image to data in a system file to determine a first location of the one or more locations that comprises a placement for the second image on the first image; based on the determining, superimposing, by the one or more processors, the second image over the first image at the first location; rendering, by the one or more processors, the two dimensional model of the object comprising the second image superimposed on the first image; and displaying, by the one or more processors, the two dimensional model in the graphical user interface.

Shortcomings of the prior art are overcome and additional advantages are provided through the provision of a system for automatic placement and layering of images at runtime. The system comprises a memory, a processor in communication with the memory, and program instructions executable by the processor via the memory to perform a method. The method includes, for instance: obtaining, by one or more processors, images comprising representations of components that comprise an object, wherein the images comprise a first image and a second image; annotating, by the one or more processors, the first image, with data indicating one or more locations on the first image where the second image can be placed, wherein a display in a graphical user interface including the first image and the second image comprises a two dimensional model of the object; determining, by the one or more processors, during runtime, a position or orientation of the one or more locations on the first image, based on the annotated first image; comparing, by the one or more processors, each location of the one or more locations on the first image to data in a system file to determine a first location of the one or more locations that comprises a placement for the second image on the first image; based on the determining, superimposing, by the one or more processors, the second image over the first image at the first location; rendering, by the one or more processors, the two dimensional model of the object comprising the second image superimposed on the first image; and displaying, by the one or more processors, the two dimensional model in the graphical user interface.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 2 depicts aspects of an existing method of providing a two dimensional model of a computing system;

FIG. 5 depicts a workflow illustrating certain aspects of an embodiment of the present invention;

DETAILED DESCRIPTION

Figure 1:
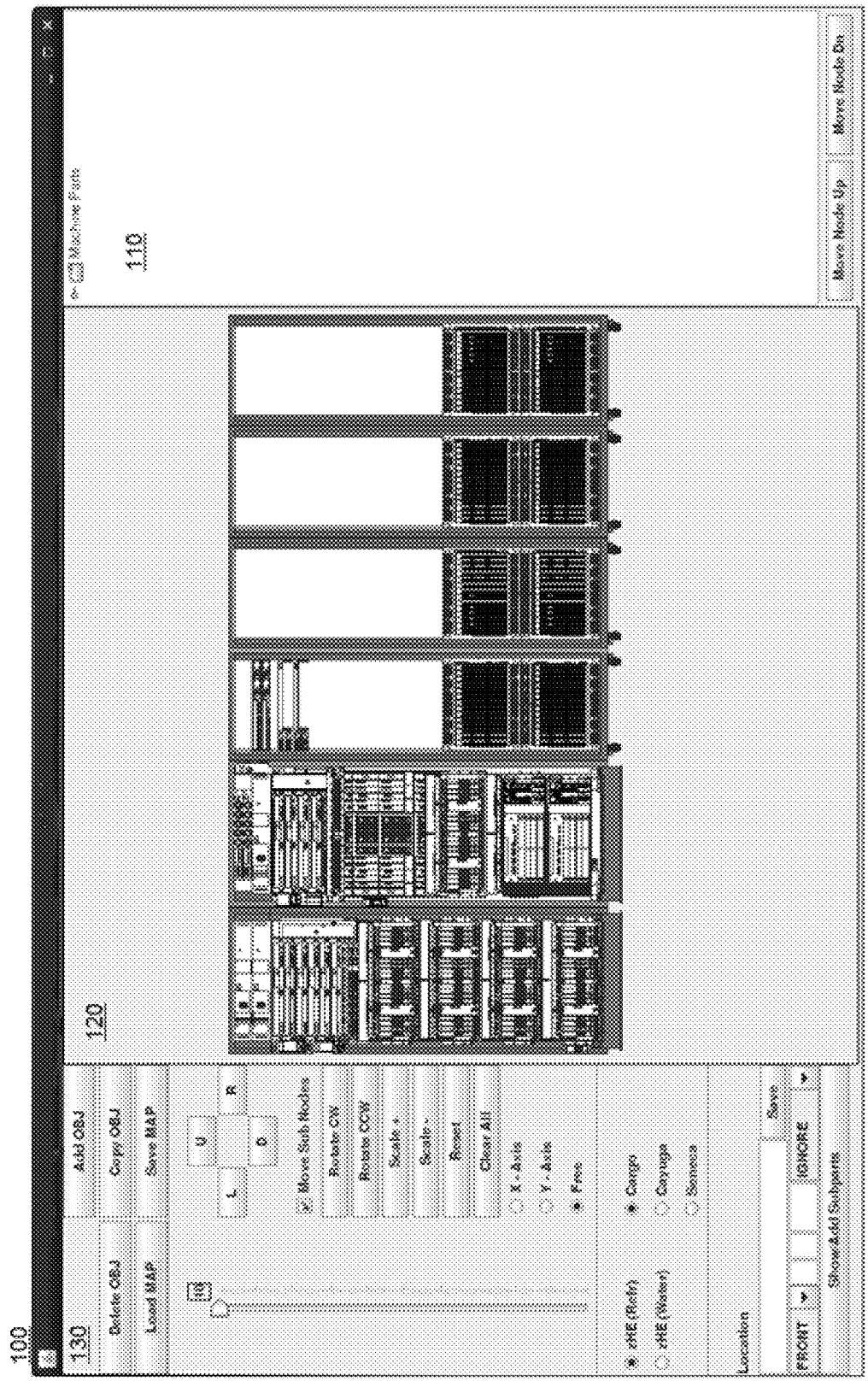
FIG. 1 depicts aspects of an existing method of providing a two dimensional model of a computing system.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 7:
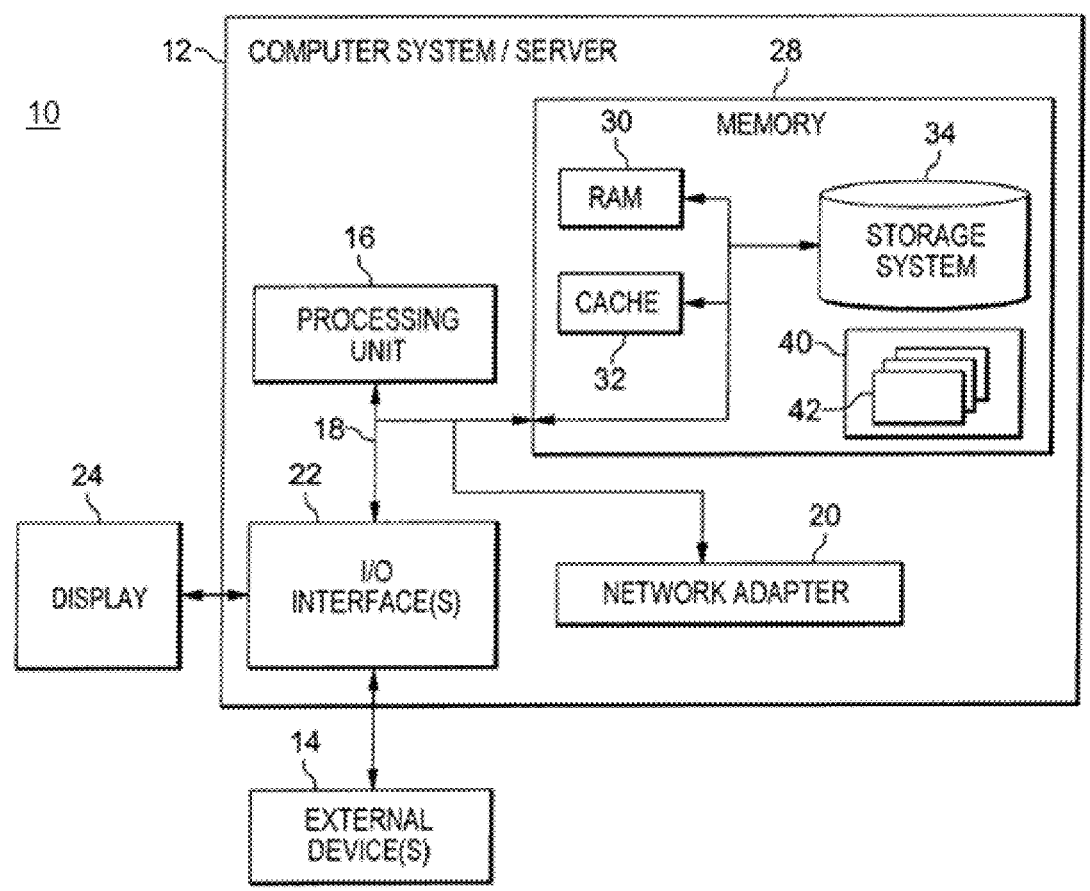
FIG. 7 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 7 as program/utility 40, having a set (at least one) of program modules 42, may be stored in memory 28.

Embodiments of the present invention include a computer system, computer program product, and computer-implemented method for spatial and hierarchical placement of images and sub-images at runtime, based on annotated elements embedded in the images themselves. Aspects of embodiments of the present invention utilize one or more programs executing on one or more processors to annotating image elements, process images, read the annotations, and place the sub-images in accordance with the annotations. Embodiments of the present invention enable the program code to automatically place, rotate, and layer sub-images, by utilizing the placement and orientation of the annotated elements. This aspect represents an improvement to computing technology by increasing the ease with which a sub-image can be added or removed by altering the image elements. Given that aspects of the invention address a particular challenge in computing, i.e., accurately imaging a computer, such as a mainframe, during runtime, and provide a method of addressing this challenge automatically, the present invention is inherently tied to computing.

Embodiments of the present invention represent an improvement in computing technology related to spatial and hierarchical placement of images at runtime, for example, for purposes of R&V, because these embodiments advantageously eliminate the need for a separate file for coordinates, layering, and rotation information, which were required by program code during an R&V process to render an image of a machine. Given that these files, and the process of creating these files, were complex and cumbersome, embodiments of the present invention improve the process by eliminating these files in favor of annotating the image elements that comprise parts of the layered model of the physical machine, when accessed by one or more programs during runtime. Specifically, embodiments of the present invention include one or more programs that add annotated elements within an image which one or more programs executed during runtime utilize to draw any sub-images, process the elements, and place the sub-images. Another advantage of embodiments of the present invention is that they eliminate the existing requirement for a proprietary visual editor, as any publicly available editor which can edit the image or object can be utilized in conjunction with aspects of the present invention to add the elements to a model of a physical machine.

Aspects of the present invention provide advantages over attempted solutions to this known issue in computing. For example, certain methods include program code that executes a color histogram analysis on an existing image of a mainframe in order to identify and segment the image into sub-images so that the program code can replace the sub-images to create a new image (i.e., replacing parts in the machine and generate an image that reflects the new technical architecture). However, this approach relies upon an already-existing image that accurately reflects the sub-images (sub-parts) that comprise the imaged machine. Unlike this approach, in embodiments of the present invention, program code builds the image from elements that provide intelligence about sub-elements that enables the program code to generate automatically new images and implements changes to parts and sub-parts without analysis. In embodiments of the present invention, as will be discussed in greater detail herein, utilizing an interface generated by program code, the user places annotated elements in a main image at to indicate prospective locations for subparts. Based on the user-configuration of the elements, the program code, at runtime, places sub-images on top of the main image at these defined locations. This process is iterative sub-images themselves can have annotated elements, which in turn can have elements, and so on.

Certain technologies communicate configuration changes of 2D images to groups of individuals in real-time. One such technology broadcasts user changes to an image in real-time. However, embodiments of the present invention benefit from utilizing automatic processes to implement, as well as communicate (e.g., via a graphical user interface) changes that affect the 2D image of the mainframe generated. For example, in embodiments of the present invention, the program code does not make changes in real-time based on user input. Rather, the program code places annotated elements in the main image and then, at runtime, places sub-images are placed on the main image, based on, for example, rotation of the annotated elements. Thus, at runtime, embodiments of the present invention do not provide functionality to enable users to alter an image via user input. The role of the user may be limited to utilizing a graphical user interface aspect of an embodiment of the present invention to annotate images to define potential locations and orientations for sub-images (sub-parts). The program code, in an embodiment of the present invention, utilizes the annotations at runtime to place sub-images at those locations automatically. Embodiments of the present invention do not provide real-time analysis of any image comprising the 2D model generated because in embodiments of the present invention, the program code overlays the main image with sub-images, based on user and/or automatically defined annotated elements.

Other technologies have been developed that generate and change images in ways that differ from those implemented in embodiments of the present invention and are not relevant or useable in the context of imaging computers, as they do not address the complexities of this task or provide solutions. For example, technologies exist that generate an image collages in which the images can be rotated, scaled, etc., but these technologies, unlike embodiments of the present invention, do not allow a sub-image (e.g., drawer) placement anywhere on a main image (e.g., frame), based on the location of defined regions for placement of the sub-image in the annotated image. Instead of adding this intelligence, or any intelligence, to the images themselves, all information related to the placement, rotation, etc., of the sub-image is contained in a main image itself template, which means that the images and sub-images do not accommodate the iterative process of embodiments of the present invention. In another technology, dimensions of a text block are adjusted at runtime to accommodate a target layout objects, but embodiments of the present invention do not adjust the size of the elements at runtime and so not require a template the sub-images are defined by elements in the main image because information regarding possible sub-image placement is annotated on each image. Embodiments of the present invention do not merely annotate an existing system file with additional metadata, such as adding global positioning system (GPS) data as metadata, rather, embodiments of the present invention include program code that places sub-images at user defined locations.

To understand the advantages provided by embodiments of the present invention, FIG. 1 is included herein to illustrate the complexities and manual efforts required to achieve spatial and hierarchical placement of images at runtime, for example, as associated with an R&V process.

FIG. 1 depicts a prior method of generating a 2D model to represent a mainframe computer and editing the model to reflect changes. Referring to FIG. 1 a screenshot 100 of a graphical user interface (GUI) rendered by a proprietary editor is pictured. At the left of the screen is a closed folder tree 110 that includes a folder with the machine parts of a given computing device. Clicking on the machine parts folder will open the tree such that all components of the machines are listed and can be individually oriented by a user. A user may also utilize the folder tree to add a new component to the physical machine being modeled. In the center of the screen is a diagram 120 of a server that a user it utilizing the GUI of this proprietary editor to create as a 2D representation. As seen in FIG. 1, the diagram 120 is of a machine that includes a frame, I/O drawers, and several I/O cards. As discussed above, the user of the GUI must set the parameters and place each item separately. At the left are various controls 130 that the user may utilize in the GUI to place and orient each element of the machine on the diagram 120. The number of components pictured is fairly large and the amount of effort required to place each object using the controls 130 individually, is labor intensive. For example, each component is placed by hand, by the user, utilizing the controls 130, for each of a front and a back view of the machine displayed in the diagram 120.

Once the mappings are completed by a user, one or more programs in this system may save the parts and orientations in a file, which can be read by one or more programs executing during runtime to render the diagram 120. Should the user change any component in the diagram 120, the user would utilize the controls 130 to make changes to the component being changed and to any component affected by this change, each separately, and each manually, for example, through the proprietary editor of FIG. 1. To highlight the complexity of a file generated by the program code in this work-intensive system as well as the granularity and complexity of the files generated to capture the manipulations of the user, FIG. 2 is provided as an example of portion of a locations map generated by this traditional system, which is retained in a system file.

Rather than subject a user to a manual process that results in a complex file (e.g., FIG. 2) that is difficult to manipulate, as illustrated in FIG. 2, embodiments of the present invention utilize a file and annotated objects to create a 2D model. In an embodiment of the present invention, a virtual product data (VPD) file is created by one or more programs when rendering a 2D model and read by one or more programs during runtime to reproduce the model.

Embodiments of the present invention benefit from the configuration of a physical machine being a hierarchical collection of components. By following this hierarchy, embodiments of the present invention generalize the generation of certain components of a 2D mode of a physical machine that were previously custom and generated through the manual process explained in conjunction with FIG. 1. For example, a given server may be comprised of a frame with locations for a given number of I/O drawers, the I/O drawers each having potential locations for I/O cards. Machines can differ greatly from each other because in different servers, for example, different components are placed at various potential locations in the frame and in the drawers, and certain potential locations are left empty. However, the machines are consistent in that the building blocks share potential locations for additional components.

Taking advantage of this hierarchy of components, also referred to as layering, for ease of understanding, in embodiments of the present invention, one or more programs, executed by at least one processor, render a 2D model of each layer (i.e., frame, drawer, and card) of a machine by annotating, on objects representing each component, potential locations and orientations for one or more subsequent components of that component. Thus, in an embodiment of the present invention, the one or more programs render a frame with at least one defined location and orientation for the potential placement of at least one I/O drawer. In turn, in an embodiment of the present invention, once the one or more programs place one or more drawers in the frame, the one or more programs render each drawer to include defined potential locations and orientations for one or more I/O cards. In an embodiment of the present invention, the one or more programs render the locations for layering of additional components as rectangles in a GUI. Utilizing the simplistic rectangle shape simplifies the formerly complex process of rendering each component in a customized manner, as seen in FIG. 1.

In an embodiment of the present invention, in the image for the frame, the program code executed by at least one processing circuit places at least one annotated shape (e.g., rectangle) at a possible location for I/O drawers in the image representing the component. In an embodiment of the present invention, the program code names the shape in a manner that corresponds to the physical locations of the potential location of the at least one drawer, relative to the frame. The program code places at least one annotated shape (e.g., rectangle) one each of the at least one the I/O drawers; each shape is a potential location and orientation for an I/O cards. In an embodiment of the present invention, each annotated shape that the program code configures on an I/O drawer model again, the program code names utilizing a scheme indicating a location of a cards relative to the drawer. In an embodiment of the present invention, the program code renders each layer such that the annotated shapes on the component(s) of each later are not visible to a user in a GUI.

Figure 3:
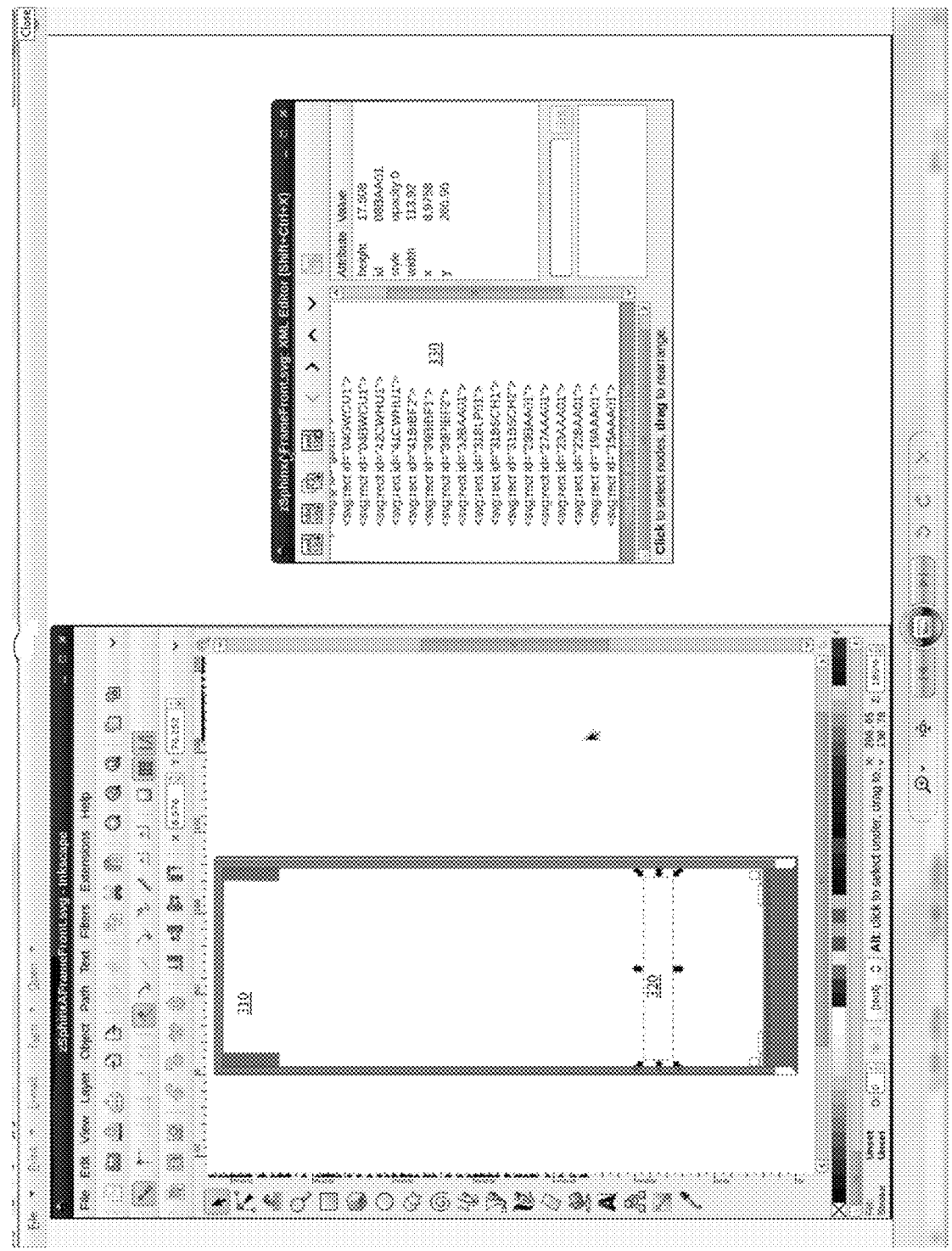
FIG. 3 depicts certain aspects of an embodiment of the present invention.

FIG. 3 is an example of an annotated shape 310, in this example, a shape 320, e.g., a rectangle, as viewed through a Scalable Vector Graphics (SVG) editor 300. As aforementioned, unlike is older systems, where each component must be edited through a proprietary editor, aspects of certain embodiments of the present invention enable components comprising the machine model to be edited using third party, standard, editing programs. As illustrated by FIG. 3, the user may select a shape by identification number from a list 330, which the program code generated based on the location of the shape 320. The user may then review and revise the attributes of the shape 320, including the height and width. Initially, the user may utilize an editor, such as the editor of FIG. 3, to place the shapes for sub-components on each shape. As illustrated in this figure, in an embodiment of the present invention, changes to the placement of the sub-images involve loading the image that with the placement in an image editor and moving the annotated rectangle to a desired location for a new placement. The program code can verify these changes immediately as because the program code annotates the new placement on the object itself, rather than in a file, there is no intermediate location file to generate. In an embodiment of the present invention, any rotation of components (sub-images) can be accomplished after the program code places them. In an embodiment of the present invention, the placement shapes are not visible to the user.

Figure 4:
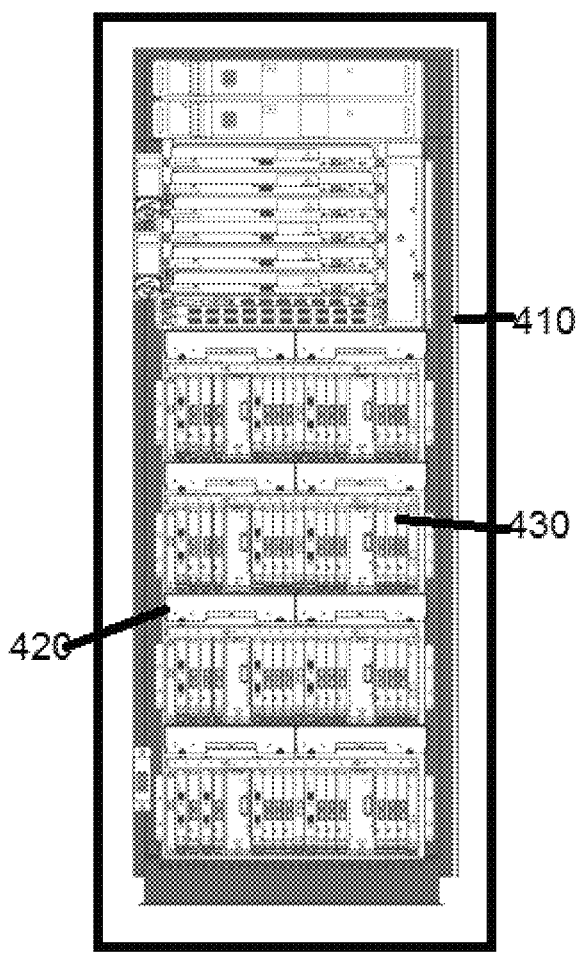
FIG. 4 depicts certain aspects of an embodiment of the present invention.

FIG. 4 is a depiction of a 2D model 400 generated by program code in an embodiment of the present invention. When generating a model, the program code ascertains where sub-components may be located on components, based on the annotations in the images of the components. The program code then references a configuration file to determine at which locations sub-component are located, for the given machine being imaged. In further embodiments of the present invention, the annotations on the images representing the layers of the machine also indicate the specific components located on that image in the given machine.

Referring to the example model 400 in FIG. 4, a specific machine is comprised of a frame 410, an I/O drawer 420, and several I/O cards, like an example I/O card 430. As explained above, before the program code generates the 2D model 400, a user has utilized an editor to notate shapes on images representing the various components such that the annotations in the images representing these components indicate where sub-components can be potentially placed, for each component. The program code may also enable the user to make these indications by providing a GUI that enables a user to place shapes on the images representing the components, including frames and I/O drawers, indicating locations and orientations for prospective sub-components (e.g., sub-images). However, regardless of the editor utilized by the user, the program code may save each image utilizing a naming convention indicating the placement of the shapes on the image. Thus, after annotation by the user, the image for the I/O drawer 420 has annotated shapes (e.g., rectangles) placed at all the possible locations for I/O cards, again, with the naming of the rectangles corresponding to the locations of the cards relative to the placed.

During runtime, program code executing on at least one processing circuit of a computing resource, including the machine being imaged, accesses the images and the annotated data associated with each image. In an embodiment of the present invention, at runtime, the program code accesses an image representing the frame 410 of the computer system being imaged. In an embodiment of the present invention, the program code may recognize the frame image based on the file name. Based on drawing the frame, the program code locates each of the shapes on the frame image indicated by the annotations and checks each of the shapes in a system file, including but not limited to, a hardware map, to determine if a part exists at the shape in the computer system. In an embodiment of the present invention, the program code may locate the shapes based on the file name of the image. If the hardware map indicates that a part exists at the location indicated by an annotation of a shape on the frame image, the program code obtains an image of the part indicated in the hardware map and renders the part at the location indicated by the annotations in the frame image. In FIG. 4, the indicated part would be I/O drawer 420, which the program code renders as a sub-part to frame 410, as illustrated in the 2D model 400. In this example, even if the frame 410 includes more shapes (e.g., rectangles), because the example machine includes one I/O drawer 420, a system file, such as the hardware map, would not include data indicating any additional I/O drawers. Having placed and rendered the I/O drawer 420, the program code would repeat the same process to determine placements for the several I/O cards.

In the manner described with reference to FIG. 4, in an embodiment of the present invention, the program code builds a 2D model 400 of the machine from the lowest level (e.g., the frame 410) to the highest level (e.g., the I/O cards 430) based in part on the information contained within the images.

The program code layers the images representing the various components automatically because the lower level parts which iteratively tell include information that indicate the placement of the higher level parts. In an embodiment of the present invention, the program code accounts for any rotation of parts by rotating the image to be placed to match the rotation of the annotated shape (e.g., rectangle). Thus, changes to the placement of the sub-images involve loading the containing image in an image editor and moving the annotated rectangle to the desired location.

FIG. 5 is a workflow 500 that illustrates one or more programs rendering a model of a computing device, including spatial and hierarchical placement of images and sub-images at runtime, in accordance with certain embodiments of the present invention. In an embodiment of the present invention, the program code obtains a first image and a second image, where the first image and the second image comprise representations of two components that comprise an object (510). The program code annotates the first image with data indicating one or more locations on the first image where the second image can be placed, where a combined view including the first image and the second image comprises a two dimensional model of the object (520). At runtime, the program code obtains the annotated first image and determines the position and orientation of the one or more locations of the first image (530). The program code compares each location of the one or more locations to data in a system file to determine, for each location, whether the second image should be placed at that location, in order to place the second image in a location that is a correct placement for the second image on the first image (540). As discussed earlier, if the system file indicates that a part exists at the location, indicated by an annotation of a shape on the frame image (e.g., the first image), the program code obtains an image of the part indicated in the hardware map (e.g., the second image) and renders the part at the location indicated by the annotations in the frame image. Based on determining the correct placement, the program code superimposes (i.e., layers) the second image over the first image at the correct placement, positioning the second image on a location of the one or more locations (550). The program code renders and displays in a graphical user interface, the two dimensional model of the object comprising the second image superimposed on the first image (560).

Although FIG. 5 describes aspects of the present invention in terms of a first image and a second image, in order to illustrate certain aspects of an embodiment of the present invention. However, as explained herein, the process is iterative process and can be utilized for any number of images. The program code ceases placing images when it has reached a topmost image that does not have any rectangles embedded, or parts to place.

Figure 6:
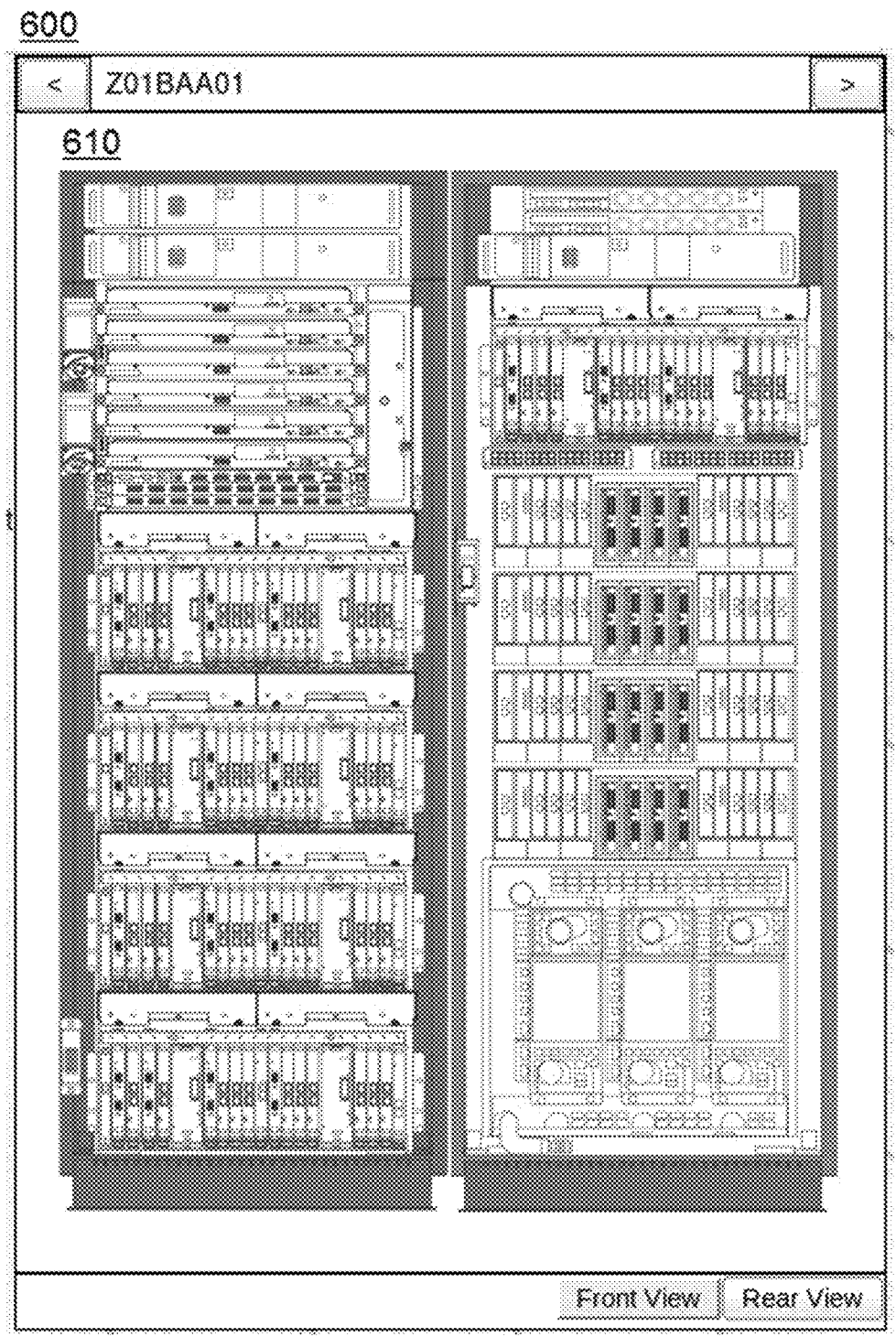
FIG. 6 depicts a graphical user interface generated by aspects of an embodiment of the present invention.

An example of a completed model, as displayed in a GUI in an embodiment of the present invention, is provided as FIG. 6. Utilizing the viewer 600 of FIG. 6, a user can highlight portions of the model 610 rendered by the program code and edit selected images and sub-images in an editor. Any changes will be realized by the program at runtime, when the program code re-builds the model 610. As in FIG. 1, the GUI in an embodiment of the present invention also affords a user of both a front and rear view of the modeled machine.

As illustrated by FIG. 3-6, some embodiments of the present invention include a computer system, a computer program product and a computer-implemented method that includes one or more programs executing on one or more processing circuits, obtaining images that include representations of components that comprise an object, where the images include a first image and a second image. The one or more programs annotate the first image, with data indicating one or more locations on the first image where the second image can be placed, where a display in a graphical user interface including the first image and the second image is a two dimensional model of the object. The one or more programs determine, during runtime, a position or orientation of the one or more locations on the first image, based on the annotated first image. The one or more programs compare each location of the one or more locations on the first image to data in a system file to determine a first location of the one or more locations that comprises a placement for the second image on the first image. Based on making this determination, the one or more programs layer the second image over the first image at the first location. The one or more programs render the two dimensional model of the object, including the second image layered on the first image. The one or more programs display the two dimensional model in the graphical user interface.

In an embodiment of the present invention, the one or more programs also obtain a third image and the one or more programs annotate the second image, with data indicating one or more locations on the second image where the third image can be placed, where the display in a graphical user interface comprising a two dimensional model of the object further comprises the third image. The one or more programs determine, during runtime, a position or orientation of the one or more locations on the second image, based on the annotated second image. The one or more programs compare each location of the one or more locations on the third image, to other data in the system file, to determine a second location of the one or more locations on the second image that comprises a placement for the third image on the second image. Based in making this determination, the one or more programs layer the third image over the second image at the second location. The one or more programs update the two dimensional model of the object comprising the second image layered on the first image to include the third image layered on the second image. The one or more programs display the updated two dimensional model in the graphical user interface.

In an embodiment of the present invention, the one or more locations on the first image are one or more rectangular areas on the first image defined by a user editing the first image in an image editor. In this embodiment the one or more programs annotate the first image by retaining data describing the rectangular areas in the first image file.

In an embodiment of the present invention, the one or more program rotate the second image in the two dimensional model, and the rotating includes the one or more programs obtaining changes to the placement for the second image on the first image, where the changes comprise rotating the second image within the first location to a new orientation. The one or more programs update, during runtime, the two dimensional model of the object comprising the second image layered on the first image at the new orientation. The one or more programs display the updated model in the graphical user interface. In an embodiment of the present invention, the changes to the placement for the second image on the first image are defined by a user editing the first image in an image editor.

In an embodiment of the present invention, the object is a computing resource that includes the one or more processors. This resource may comprise a mainframe computer. In an embodiment of the present invention, the first image is an image of a frame or of an I/O drawer. In an embodiment of the present invention, the first image is an image of a frame and the second image is an image of an I/O drawer. In an embodiment of the present invention, the first image is an image of an I/O drawer and the second image is an image of an I/O card.

Referring now to FIG. 7, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the computer system which is imaged during runtime by one or more programs in an embodiment of the present invention can be understood as cloud computing node 10 (FIG. 7) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
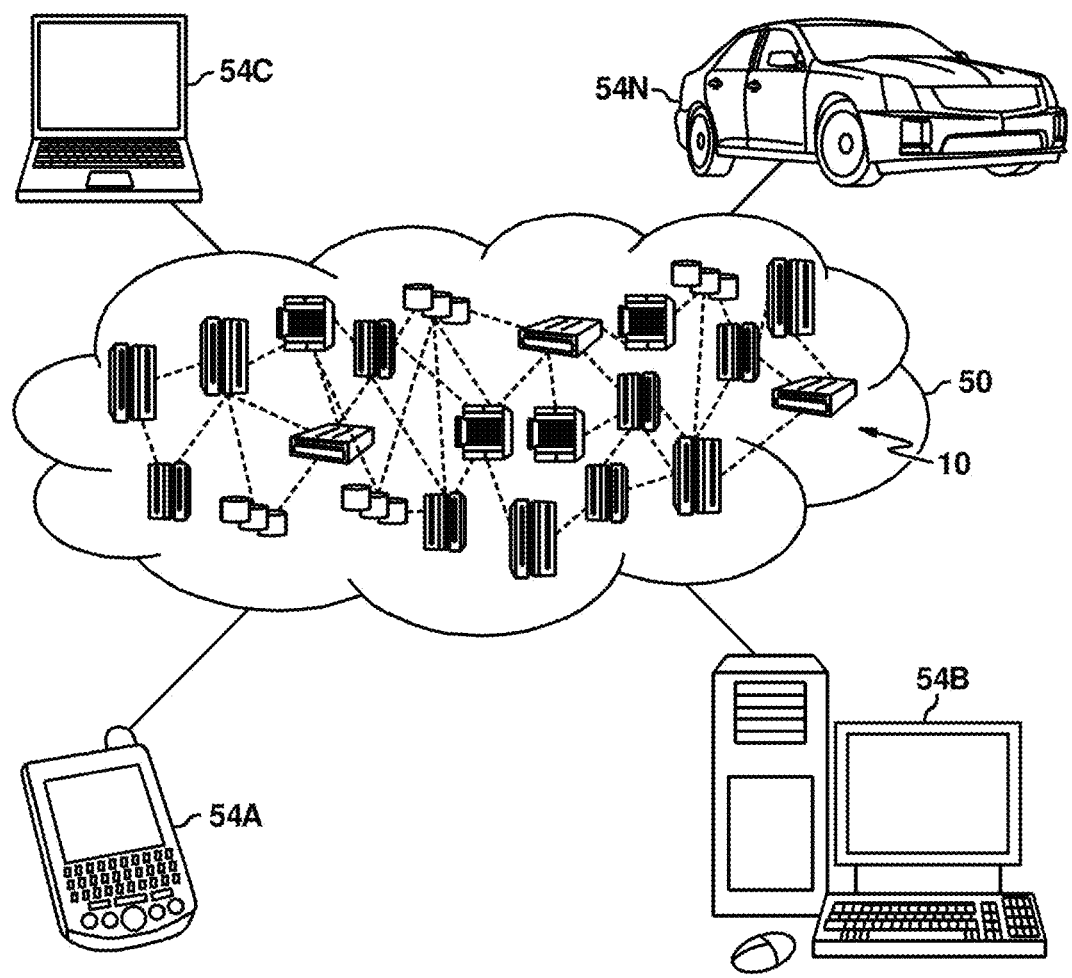
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
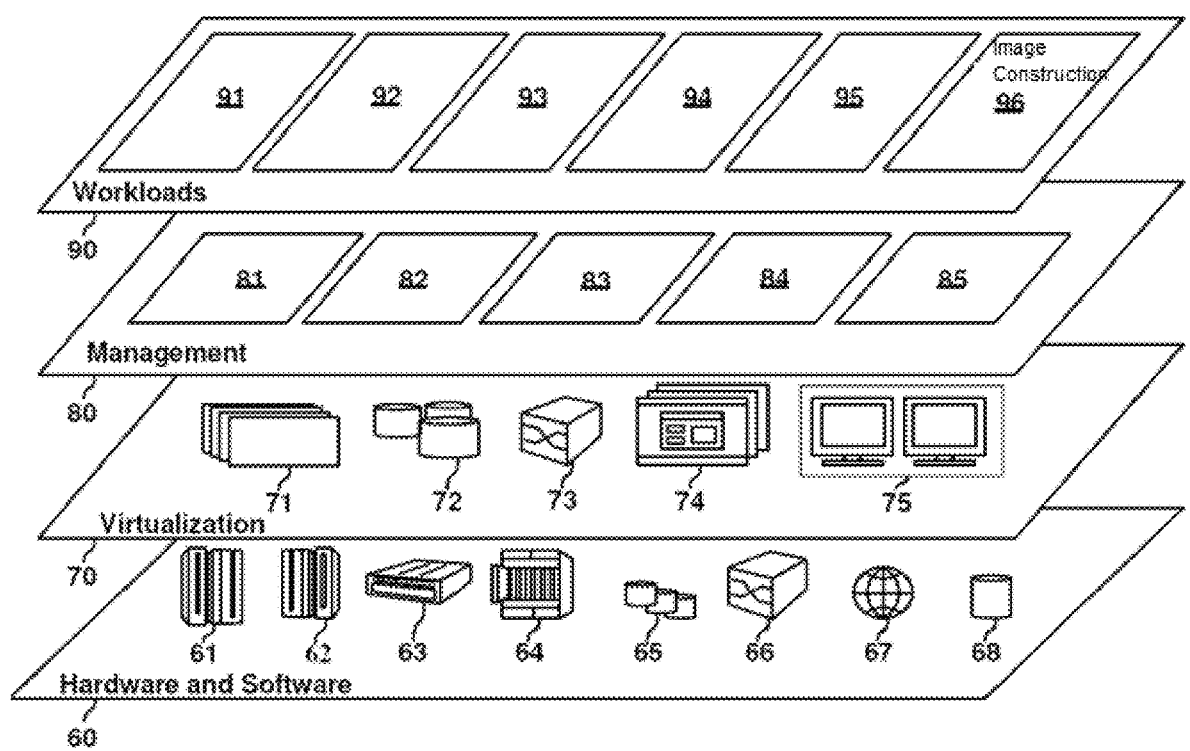
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and constructing an image of a computing system 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   obtaining, by one or more processors, images comprising representations of components that comprise an object in three dimensional space, wherein the images comprise a first image and a second image, wherein the first image comprises a two dimensional image of a first portion of the object and the second image comprises a two dimensional image of a second portion of the object;
   annotating, by the one or more processors, the first image, with data indicating one or more locations on the first image where the second image can be placed, wherein a display in a graphical user interface including the first image and the second image comprises a two dimensional model of the object, wherein one location of the one or more locations comprises an actual location of the first portion of the object relative to the second portion of the object in the three dimensional space;
   determining, by the one or more processors, during runtime, a position or orientation of the one or more locations on the first image, based on the annotated first image;
   comparing, by the one or more processors, each location of the one or more locations on the first image to data in a system file to determine one or more designated locations of the one or more locations, wherein each designated location comprises a placement for the second image on the first image;
   based on the determining, layering, by the one or more processors, the second image over the first image at the one or more designated locations;
   rendering, by the one or more processors, a runtime generated two dimensional model of the object comprising the second image layered on the first image at the one or more designated locations; and
   displaying, by the one or more processors, the runtime generated two dimensional model in the graphical user interface.

2. The computer-implemented method of claim 1, wherein the images further comprise a third image, the computer-implemented method further comprising:
   annotating, by the one or more processors, the second image, with data indicating one or more locations on the second image where the third image can be placed, wherein the display in a graphical user interface comprising a two dimensional model of the object further comprises the third image;
   determining, by the one or more processors, during runtime, a position or orientation of the one or more locations on the second image, based on the annotated second image;
   comparing, by the one or more processors, each location of the one or more locations on the second image, to other data in the system file, to determine a second location of the one or more locations on the second image that comprises a placement for the third image on the second image;
   based on the determining, layering, by the one or more processors, the third image over the second image at the second location;
   updating, by the one or more processors, the runtime generated two dimensional model of the object comprising the second image layered on the first image to include the third image layered on the second image; and
   displaying, by the one or more processors, the updated runtime generated two dimensional model in the graphical user interface.

3. The computer implemented method of claim 1, wherein the one or more locations on the first image comprise one or more rectangular areas on the first image defined by a user editing the first image in an image editor and the annotating comprises retaining data describing the rectangular areas in the first image file.

4. The computer implemented method of claim 1, further comprising:
   rotating, by the one or more processors, the second image in the two dimensional model, the rotating comprising:
   obtaining, by the one or more processors, changes to a selected placement at a location of the one or more designated locations for the second image on the first image, wherein the changes comprise rotating the second image within the location to a new orientation;
   updated, by the one or more processors, during runtime, the two dimensional model of the object comprising the second image layered on the first image at the new orientation; and
   displaying, by the one or more processors, the updated runtime generated two dimensional model in the graphical user interface.

5. The computer implemented method of claim 4, wherein the changes to the selected placement for the second image on the first image are defined by a user editing the first image in an image editor.

6. The computer implemented method of claim 1, wherein the object comprises a computing resource comprising the one or more processors.

7. The computer implemented method of claim 6, wherein the computing resource comprises a mainframe computer.

8. The computer implemented method of claim 1, wherein the first image comprises an image of a component selected from the group consisting of: a frame and an I/O drawer.

9. The computer implemented method of claim 1, wherein the first image comprises an image of a frame and the second image comprises an image of an I/O drawer.

10. The computer implemented method of claim 1, wherein the first image comprises an image of an I/O drawer and the second image comprises an image of an I/O card.

11. A computer program product comprising:
    a computer readable storage medium readable by one or more processors and storing instructions for execution by the one or more processors for performing a method comprising:
    obtaining, by the one or more processors, images comprising representations of components that comprise an object in three dimensional space, wherein the images comprise a first image and a second image, wherein the first image comprises a two dimensional image of a first portion of the object and the second image comprises a two dimensional image of a second portion of the object;

annotating, by the one or more processors, the first image, with data indicating one or more locations on the first image where the second image can be placed, wherein a display in a graphical user interface including the first image and the second image comprises a two dimensional model of the object, wherein one location of the one or more locations comprises an actual location of the first portion of the object relative to the second portion of the object in the three dimensional space;

determining, by the one or more processors, during runtime, a position or orientation of the one or more locations on the first image, based on the annotated first image;

comparing, by the one or more processors, each location of the one or more locations on the first image to data in a system file to determine one or more designated locations of the one or more locations, wherein each designated location comprises a placement for the second image on the first image;

based on the determining, layering, by the one or more processors, the second image over the first image at the one or more designated locations;

rendering, by the one or more processors, a runtime generated two dimensional model of the object comprising the second image layered on the first image at the one or more designated locations; and displaying, by the one or more processors, the runtime generated two dimensional model in the graphical user interface.

12. The computer program product of claim 11, wherein the images further comprise a third image, the computer-implemented method further comprising:

annotating, by the one or more processors, the second image, with data indicating one or more locations on the second image where the third image can be placed, wherein the display in a graphical user interface comprising a two dimensional model of the object further comprises the third image;

determining, by the one or more processors, during runtime, a position or orientation of the one or more locations on the second image, based on the annotated second image;

comparing, by the one or more processors, each location of the one or more locations on the second image, to other data in the system file, to determine a second location of the one or more locations on the second image that comprises a placement for the third image on the second image;

based on the determining, layering, by the one or more processors, the third image over the second image at the second location;

updating, by the one or more processors, the runtime generated two dimensional model of the object comprising the second image layered on the first image to include the third image layered on the second image; and displaying, by the one or more processors, the updated runtime generated two dimensional model in the graphical user interface.

13. The computer program product of claim 11, wherein the one or more locations on the first image comprise one or more rectangular areas on the first image defined by a user editing the first image in an image editor and the annotating comprises retaining data describing the rectangular areas in the first image file.

14. The computer program product of claim 11, further comprising:

rotating, by the one or more processors, the second image in the two dimensional model, the rotating comprising:
rotating, by the one or more processors, the second image in the two dimensional model, the rotating comprising:
obtaining, by the one or more processors, changes to a selected placement at a location of the one or more designated locations for the second image on the first image, wherein the changes comprise rotating the second image within the location to a new orientation;

updated, by the one or more processors, during runtime, the two dimensional model of the object comprising the second image layered on the first image at the new orientation; and displaying, by the one or more processors, the updated runtime generated two dimensional model in the graphical user interface.

15. The computer program product of claim 14, wherein the changes to the selected placement for the second image on the first image are defined by a user editing the first image in an image editor.

16. The computer program product of claim 11, wherein the object comprises a computing resource comprising the one or more processors.

17. The computer program product of claim 16, wherein the computing resource comprises a mainframe computer.

18. The computer program product of claim 11, wherein the first image comprises an image of a component selected from the group consisting of: a frame and an I/O drawer.

19. The computer program product of claim 11, wherein the first image comprises an image of a frame and the second image comprises an image of an I/O drawer.

20. A system comprising:
a memory;
one or more processors in communication with the memory; and
program instructions executable by the one or more processors via the memory to perform a method, the method comprising:
obtaining, by the one or more processors, images comprising representations of components that comprise an object in three dimensional space, wherein the images comprise a first image and a second image, wherein the first image comprises a two dimensional image of a first portion of the object and the second image comprises a two dimensional image of a second portion of the object;

annotating, by the one or more processors, the first image, with data indicating one or more locations on the first image where the second image can be placed, wherein a display in a graphical user interface including the first image and the second image comprises a two dimensional model of the object, wherein one location of the one or more locations comprises an actual location of the first portion of the object relative to the second portion of the object in the three dimensional space;

determining, by the one or more processors, during runtime, a position or orientation of the one or more locations on the first image, based on the annotated first image;

comparing, by the one or more processors, each location of the one or more locations on the first image to data in a system file to determine one or more designated locations of the one or more locations, wherein each designated location comprises a placement for the second image on the first image;
based on the determining, layering, by the one or more processors, the second image over the first image at the one or more designated locations;
rendering, by the one or more processors, a runtime generated two dimensional model of the object comprising the second image layered on the first image at the one or more designated locations; and
displaying, by the one or more processors, the runtime generated two dimensional model in the graphical user interface.

* * * * *